(12) United States Patent
Richards

(10) Patent No.: US 6,668,729 B1
(45) Date of Patent: Dec. 30, 2003

(54) TRANSIT SYSTEM

(76) Inventor: Bryan Richards, 3285 N. Brookside Dr., Provo, UT (US) 84604

( * ) Notice: Subject to any disclaimer, the term of this patent is extended or adjusted under 35 U.S.C. 154(b) by 0 days.

(21) Appl. No.: 10/225,225

(22) Filed: Aug. 21, 2002

(51) Int. Cl.[7] .............................................. B61B 12/04
(52) U.S. Cl. ....................................... 104/124; 104/27
(58) Field of Search ........................ 104/124, 27, 138.1, 104/137, 141, 301, 281, 287, 37, 88.01, 88.02; 404/1, 9; 180/167, 168; 901/24

(56) References Cited

U.S. PATENT DOCUMENTS

| | | | | |
|---|---|---|---|---|
| 456,434 | A | * 7/1891 | Samuel | 104/141 |
| 3,285,194 | A | * 11/1966 | Clejan | 104/27 |
| 5,138,952 | A | 8/1992 | Low | |
| 5,473,233 | A | 12/1995 | Stull et al. | |
| 5,655,244 | A | 8/1997 | Minakami et al. | |
| 5,845,583 | A | 12/1998 | Jensen | |
| 5,846,020 | A | * 12/1998 | McKeown | 404/1 |
| 6,092,468 | A | * 7/2000 | Hase | 105/73 |
| 6,169,954 | B1 | 1/2001 | McCrary | |
| 6,249,724 | B1 | 6/2001 | McCrary | |
| 6,263,799 | B1 | 7/2001 | Pardes | |
| 6,276,542 | B1 | 8/2001 | McCrary | |
| 6,308,640 | B1 | * 10/2001 | Weule et al. | 105/72.2 |
| 6,318,274 | B1 | * 11/2001 | Park | 104/88.02 |

FOREIGN PATENT DOCUMENTS

GB   WO 98/24673 A1 * 6/1998

OTHER PUBLICATIONS

"Future of Vehicle Transportation Could be 'RUF'" CNN.com/SCI-TECH by Marsha Walton, Mar. 9, 2001.

* cited by examiner

Primary Examiner—S. Joseph Morano
Assistant Examiner—Frantz F. Jules
(74) Attorney, Agent, or Firm—Thorpe North & Western, LLP

(57) ABSTRACT

A transit system for individual vehicles includes a substantially enclosed guideway with a transit lane and a transition lane. Disposed along the guideway are selectively actuable portals, configured to allow substantially transverse ingress and egress of vehicles into the transition lane. The vehicles are configured for automatic control within the guideway and during ingress and egress, and may also be configured for independent control by a driver outside the guideway. In the transition lane the vehicles accelerate to a transit speed and merge into the adjacent transit lane. Upon approaching a selected destination portal, an individual vehicle merges back into the transition lane to decelerate for exit. The guidance system allows the vehicles to combine into controllably linked "trains" in the transit lane.

26 Claims, 8 Drawing Sheets

TRANSIT SYSTEM

BACKGROUND OF THE INVENTION

1. Field of the Invention

The present invention relates generally to rapid transit systems. More particularly, the present invention relates to a transit system that combines multiple independent vehicles into controllably linked high speed "trains" on an enclosed guideway, and automatically controls the operation and path of each vehicle to reach independently selected destinations.

2. Related Art

Problems of urban congestion, pollution, and traffic snarls are not new. As the world's population has increased, it has become more urbanized, which has only increased the severity of these problems. While the automobile has made man more mobile, it has also added to problems of congestion and pollution, and greatly increased man's consumption of certain natural resources. It has also greatly increased the likelihood of death or injury from transportation accidents. Moreover, the infrastructure required to support the vast number of trucks and cars consumes enormous amounts of public funds, building materials, and real estate. In the United States especially, the love affair with the automobile has spawned vast efforts in highway building to accommodate public demand. However, the rate of road building generally has not kept up with the rate of car driving and car buying. Consequently, congestion, pollution, and other related problems continue to increase. These issues all point out the need for better and more efficient mass transportation systems.

Transportation greatly affects the economy. One purpose of the Commerce Clause of the U.S. Constitution is to eliminate self-protective trade barriers between states. The familiar interstate freeway is one aspect of modern America that reflects this desire to reduce barriers, and is an important factor in this country's overall economic strength. Any driver can travel from state to state without stopping, buy and sell goods across state lines without paying tariffs, and without enduring border checkpoints and other inconveniences.

On the other hand, increased mobility presents security challenges for communities. Easy mobility contributes to greater anonymity and crime because, again, any driver can travel anywhere. Los Angeles, for example, has one of the finest freeway systems in the world. But when it came time to expand this grid by connecting I-210 to I-710, South Pasadena successfully fought the expansion for decades. They believed that the freeway would increase crime and erode the familiarity unique to their community. Similar opposition to freeway building has also been successful in other communities, such as Greenwich Village, N.Y. in the 1970's. Besides splitting neighborhoods, open freeways allow criminals to quickly and easily enter a community, commit a crime, and depart quickly.

While South Pasadena understood the hidden costs of a new freeway, the lack of connection between the 210 and 710 also hindered transit that would normally pass-by without stopping. By-passing transit encroaches on communities, but communities also encroach on by-passing transit. Growing communities tend to congest the transit systems, especially traditional high-speed ground transportation systems since they have dependencies or tiered collection systems. For example, local streets, collectors, and arterials collect traffic for freeways. Busses and planes do the same using hubs. These tiered collection systems represent an enormous supporting infrastructure.

To address these challenges, there have been many proposals for transit systems to help reduce the burden on (and need for) conventional surface roadways. Unfortunately, while mass transit systems have been built, expanded, and promoted, they can be very expensive to construct, they tend to be slow, and their scope remains relatively limited, particularly in areas of relatively low population density. Additionally, it has proven very difficult to wean Americans from their private automobiles when mass transit systems cannot offer the speed, independence, and flexibility that one enjoys with a private vehicle on open public roads.

SUMMARY OF THE INVENTION

It has been recognized that it would be advantageous to develop a high-speed transit system that provides independence and flexibility comparable to what drivers of private automobiles are accustomed to—allowing them to go where they want when they want.

It would also be advantageous to have a transit system that is compatible with private automobiles.

It would also be desirable to have a transit system that is enclosed and physically separated from other transit systems, vehicles, and pedestrians, so as to minimize safety and crime problems.

It would also be desirable to have an enclosed transit system that can be easily modified to allow ingress and egress at any additional desired point along its length.

It would also be desirable to have a transit system that can allow restricted ingress and egress at designated points.

It would also be desirable to have such a transit system that takes advantage of rapid computer-aided design and mass production techniques so that it is relatively inexpensive to build.

The invention advantageously provides a transit system for individual vehicles, including a substantially enclosed guideway with a transit lane and a transition lane. Disposed along the guideway are selectively actuable portals, configured to allow substantially transverse ingress and egress of vehicles into the transition lane. The vehicles are configured for automatic control within the guideway and during ingress and egress, and may also be configured for independent control by a driver outside the guideway. In the transition lane the vehicles accelerate to a transit speed and merge into the adjacent transit lane. The guidance system allows the vehicles to combine into controllably linked "trains" in the transit lane. Upon approaching a selected destination portal, an individual vehicle returns to the transition lane to decelerate for exit. The guideway is preferably comprised of individual guideway modules which are mass-produced to produce an economical system.

In accordance with a more detailed aspect of the present invention, the cost of use of the system is apportioned per vehicle depending upon various transportation economic factors, such as the distance traveled, the location of the origin portal, the location of the destination portal, the time of day, the degree of actual congestion within the guideway while the vehicle is traveling therein, the physical size of the vehicle, the priority of the vehicle, etc.

Additional features and advantages of the invention will be apparent from the detailed description which follows, taken in conjunction with the accompanying drawings, which together illustrate, by way of example, features of the invention.

DETAILED DESCRIPTION

Figure 1:
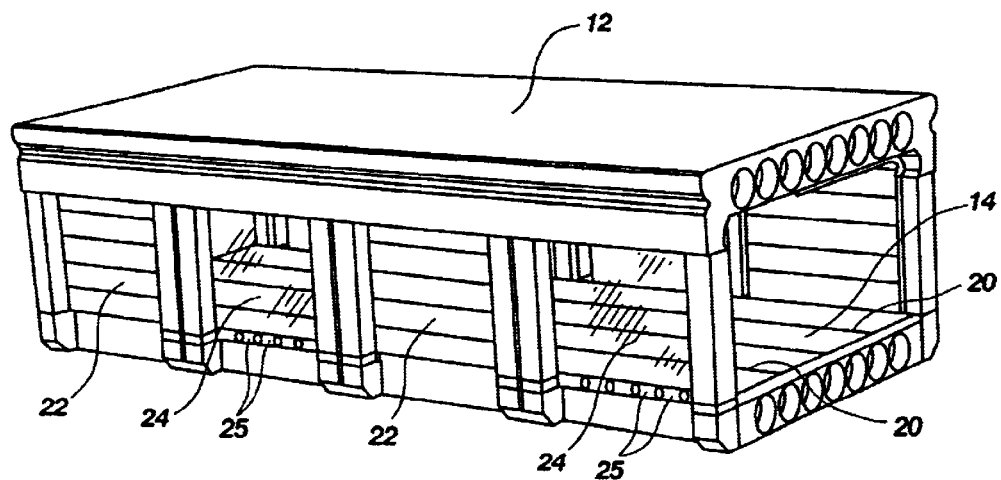
FIG. 1 is a perspective view of one embodiment of a single guideway segment for a transit system inaccordance with the present invention.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Creating high-speed multipoint-to-multipoint transit has always been a distant fantasy for wandering minds, exemplified by visions of magic carpet rides and science fiction transporters. The optimal process has remained elusive. However, the present invention makes high-speed multipoint-to-multipoint transit possible and economical without compromising accessibility or security in adjoining communities. The present System replaces traditional hubs and collectors with multipoint-to-multipoint transit. The invention is achieved by building a unique set of components: a multipurpose Transition Lane, non-stop Transit Lane and access Portals, which enable a repeatable, tubelike guideway segment. The Integrated Process of the System also decreases the area of land required for transit.

Traditionally, high-speed ground vehicles are monolithic, lumbering trains. They are not multipoint-to-multipoint vehicles; that is, they do not allow passengers to board or get off except at designated stops. The multipoint-to-multipoint system of the present invention allows users to board the system at any point along its line, and leave the system at any point along its line without inconveniencing other users.

Figure 2:
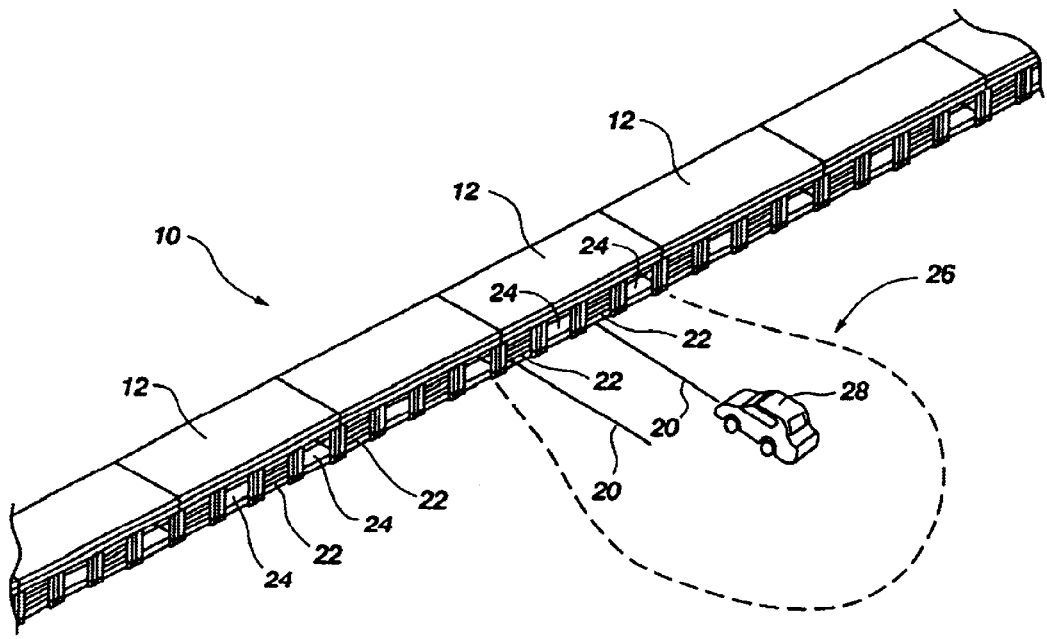
FIG. 2 is a perspective view of a port and an adjacent section of a complete guideway.

Referring to FIGS. 1 and 2, the invention includes a transit guideway 10 made up of a plurality of substantially enclosed guideway modules or segments 12, disposed end-to-end. Each module includes a riding surface 14 with a transit lane 16 and a transition lane 18, and a guide line 20 disposed in each lane. The guide line is configured for guiding vehicles 28 in the guideway, and may also be an electrical power supply line for providing electrical power to the vehicles.

As used herein, the term "vehicle" is intended to encompass any transportation vehicle having any type of propulsion system that may be compatible with the system, whether now known or later developed. For example, battery-powered electric vehicles, fuel cell-powered electric vehicles, electric vehicles that draw power from a shared power grid, and even vehicles with internal combustion engines could be used. It will be apparent that the substantially enclosed guideway 12 would tend to trap vehicle emissions, making gasoline and diesel-powered vehicles with conventional internal combustion engines poorly suited to the invention. However, some cleaner internal combustion engine vehicles - such as those that burn natural gas or pure hydrogen —could be suitable for this invention. However, electric vehicles are probably best suited to this invention. Moreover, for the sake of reliability, the vehicles may be configured to draw from redundant power sources. For example, an electric vehicle may have its own on-board electric power storage (e.g. batteries) or production (e.g. hydrogen fuel cells) capacity, along with a mechanism for drawing power from the guideway.

Figure 9:
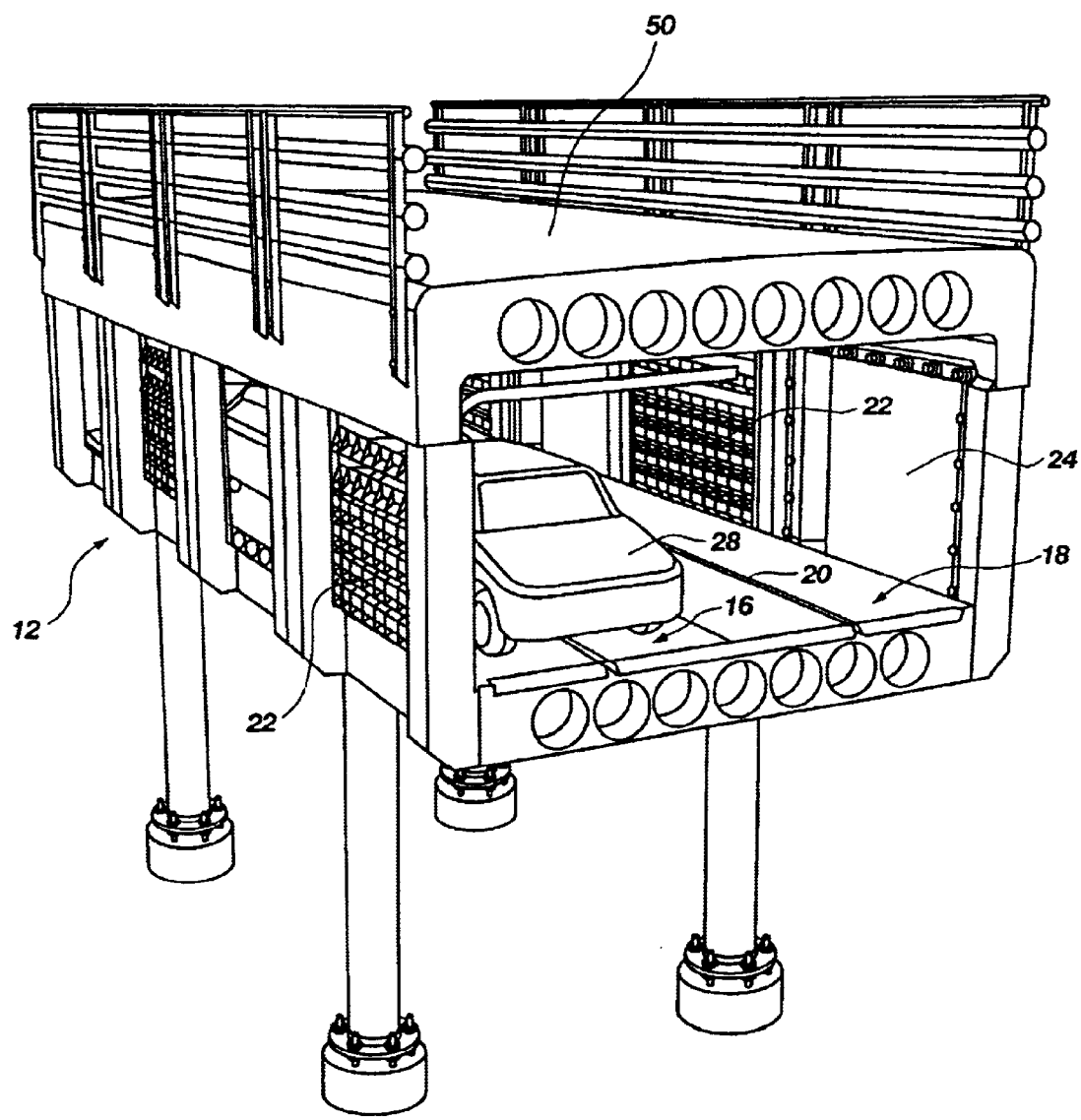
FIG. 9 is a perspective view of an elevated guideway segment with a pedestrian pathway thereatop.

Advantageously, the guideway modules 12 may be economically produced using assembly line techniques. The modules are very narrow, being just wide enough for the enclosed vehicles 28 in the lanes 16 and 18. The modules are preferably substantially enclosed, with portals 22 and windows 24 along each side. The portals comprise doors which, when activated, are openable to allow vehicles to enter or leave the guideway, but which generally remain closed for safety purposes. Indeed, the doors are only openable at activated portals, as described below. The windows 24 allow light to come in, and have drain openings 25 which allow air, some debris, and water to escape. The enclosed guideway configuration enhances safety, reduces noise to surrounding areas, and provides structural rigidity, allowing a standard module 12 to be used on-grade, or elevated as a bridge span, as depicted in FIG. 9. For elevated guideways, the support columns 60 may be provided with height adjusters, such as screws, bolts, etc., to allow very accurate alignment of adjacent guideway segments, and to allow periodic adjustment, such as to compensate for settlement of foundations, etc.

Figure 10:
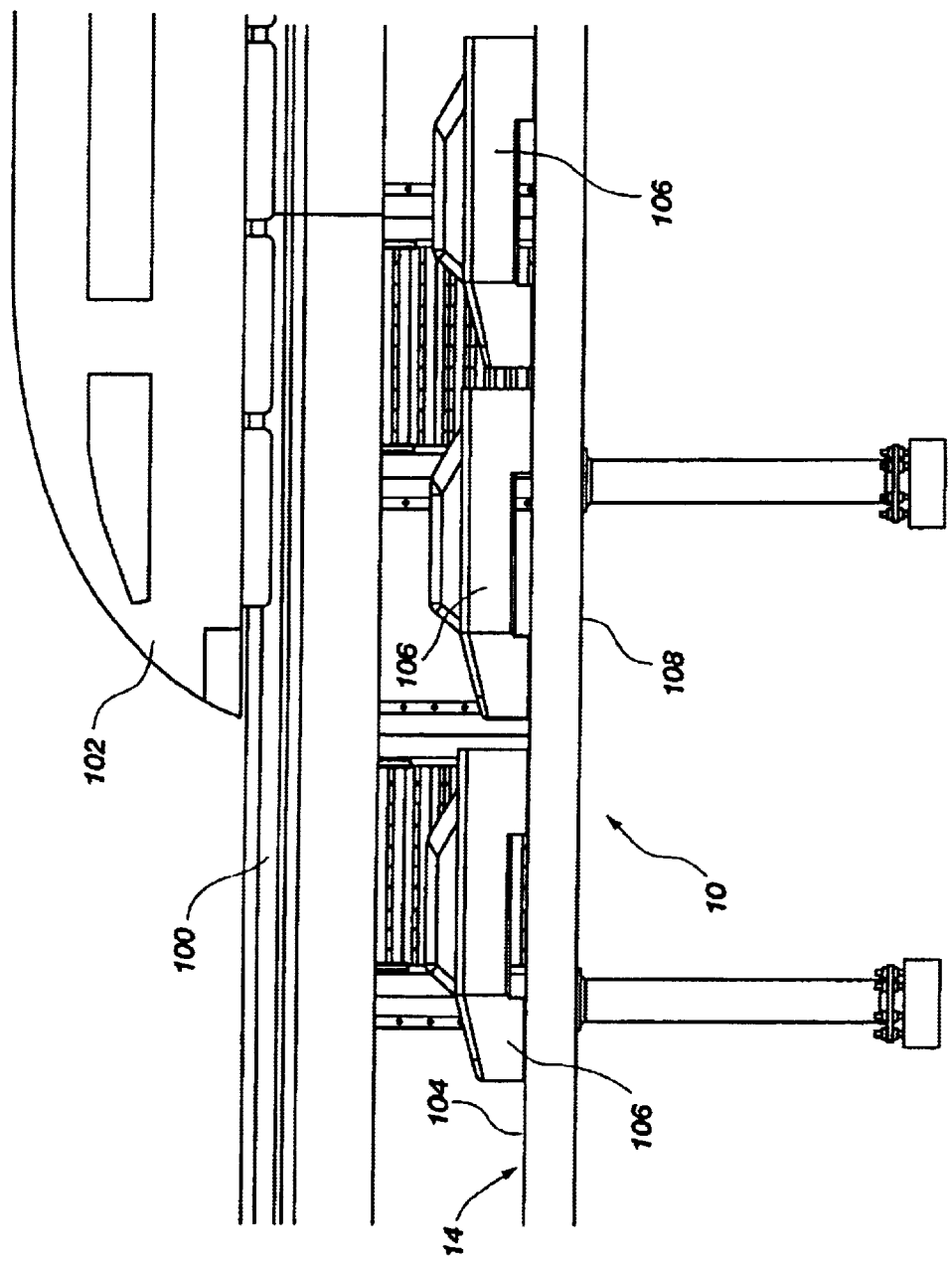
FIG. 10 is a side view of a guideway configured for accommodating magnetic levitation vehicles.

As shown in FIG. 9, the top of the guideway modules may be configured as a pedestrian pathway 50, which allows pedestrians, bicyclists, and even service vehicles and others to use the guideway structure. Alternatively, as shown in FIG. 10, the top of the guideway 10 could be configured to accommodate one or more tracks 100 for a mass-transit train 102. Such a train could, for example, be a magnetically levitated (maglev) train that does not ride on wheels, but "floats" just above the guideway in a magnetic field, thus having very low friction and requiring less energy for propulsion. Similarly, the riding surface 14 of the guideway could be configured as a maglev track 104, configured to accommodate individual specialized maglev vehicles 106. Additionally, a track (not shown) could be disposed on the underside 108 of the guideway to accommodate suspended vehicles, whether individual vehicles or a mass-transit train. Such a track for suspended vehicles could also employ magnetic levitation technology. These magnetic levitation tracks and associated vehicles could be configured for either high- or low-speed operation. The principles of magnetic levitation for transit vehicles are well known, and are under continued research and development and commercial implementation around the world in both high- and low-speed installations. See *Low Speed Maglev Technology Development Program, March* 2002 *Final Report* (U.S. Dept. of Transportation). Maglev vehicles are typically propelled by either a Linear Induction Motor (LIM) or a Linear Synchronous Motor (LSM) (referred to collectively herein as "linear motors"), wherein electric motor components (i.e. rotor and stator) are elongated into a linear configuration and are shared between the vehicle and the guideway (i.e, the vehicle includes the rotor components, and the guideway the stator, or vice versa). The motor components, whether in the vehicle or the guideway, are powered to produce an electromagnetic wave that directly pulls the vehicle along the guideway. Advantageously, in such propulsion systems the only moving part in the motor is the vehicle itself. Such propulsion systems can also be used with wheeled vehicles.

Referring back to FIG. 2, positioned at selected locations along the guideway 10 are ports 26, each disposed adjacent to one or more selected and activated portals 22. The ports are configured to allow vehicles 28 to enter or leave the guideway through the activated portals. The ports could take many forms, from large, publicly accessible transit plazas, to small private ports, even a single private garage. The system is designed to operate with autonomous vehicles. The vehicles each have typical motor vehicle controls which allow independent control of the vehicle by a driver on conventional roadways, but also include an automatic guidance system which allows (i) automatic guidance of the vehicle during ingress and egress through a portal, and (ii) interconnected control of the vehicle as part of a "train" 30 of similar vehicles within the guideway. A variety of computerized systems for providing such guidance have been developed, and are generally referred to as "Intelligent Vehicle Highway Systems" (IVHS). The vehicles may also be configured to draw electrical power from the guide line 20, as well as be guided by it.

In operation, a registered user first queries the computerized control system about available commutes between the departure Port and destination Port. Once the system secures all available commutes, the registered user can view and select available commutes. A vehicle can be summoned to a particular Port, or the user may query using a computer console (not shown) within the Vehicle. The System is designed to be communication-device independent and language independent. For safety, security and convenience, a simple phone call could remind the commuter that it is his or her turn to enter the respective Port, and a response on the user's phone could unlock the personal, commercial or public Vehicle.

Figure 7:
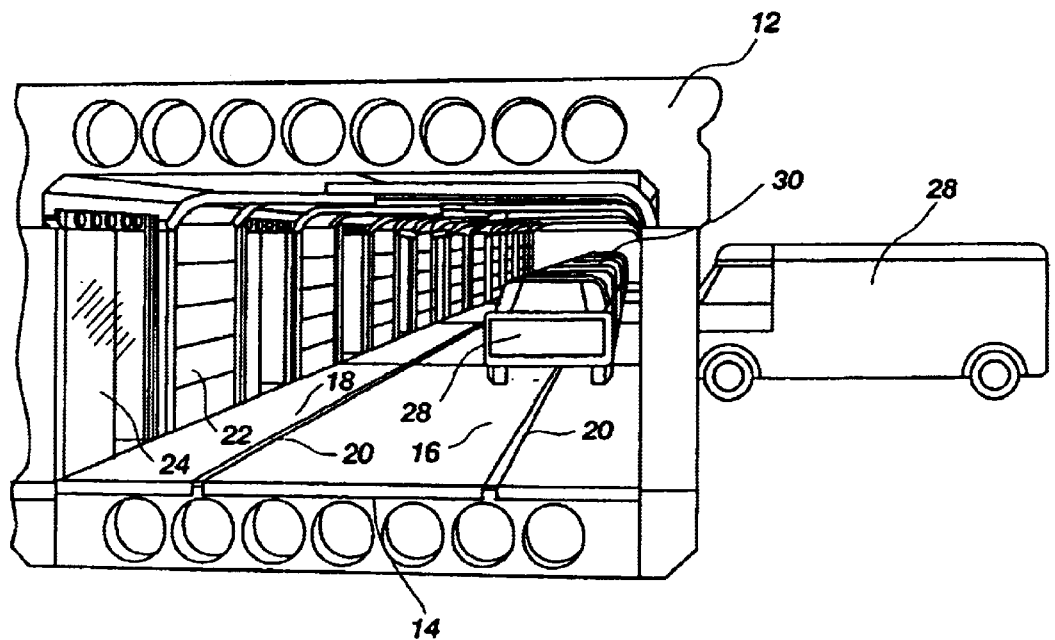
FIG. 7 is a perspective view looking down the guideway, showing a vehicle awaiting the passage of a train before it can enter a portal.

Referring to FIGS. 2 and 7, in operation, a vehicle 28 at a port 26 approaches an activated portal 22, whereupon control is taken over by the automatic guidance system. As a safeguard, before the Commute commences, the Vehicle(s) respective Portal remains closed and the Port is closed. Motion in the area is checked. If no motion is sensed, the area is clear and all sensors in the vehicle(s) are "go," the Portal door opens and opens a path from the port to the guideway segment. The portal door opens, and the guidance system guides the vehicle along a guide line 20 through the portal, and maneuvers it into the transition lane 18, facing in the transit direction 32.

Because of the small dimensions of the guideway 10, maneuvering into or out of the guideway will always require crossing the transit lane, and thus must be done within relief gaps 34 between vehicles or groups of vehicles (trains 30) already traveling in the transit lane 16. Depicted in FIGS. 3–6 are-two methods of entering the guideway and two methods of exiting the guideway, depending upon the location (that is, the side of the guideway) of the transit lane 16 relative to the respective entry portal. These methods apply to any portal on the system, and make the portals dynamic in terms of ingress and egress, and allow each guideway to accommodate traffic in the reverse direction if required. The path for each vehicle is optimized relative to the standard paths distributed to each portal and provided by each port.

Figure 3:
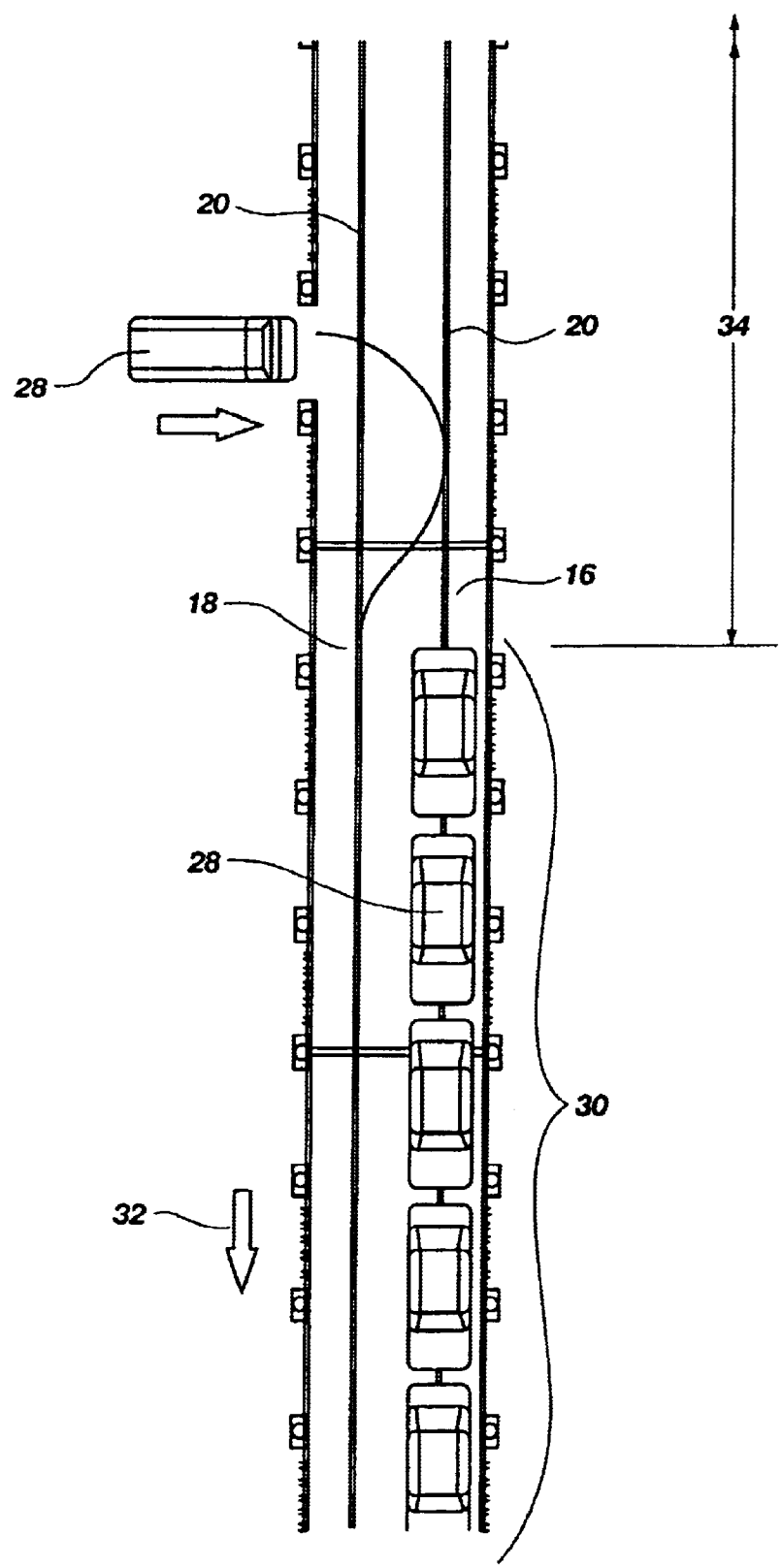
FIG. 3 depicts the method of ingress where the transit lane is on the opposite side of the guideway from entrance portal.
Figure 4:
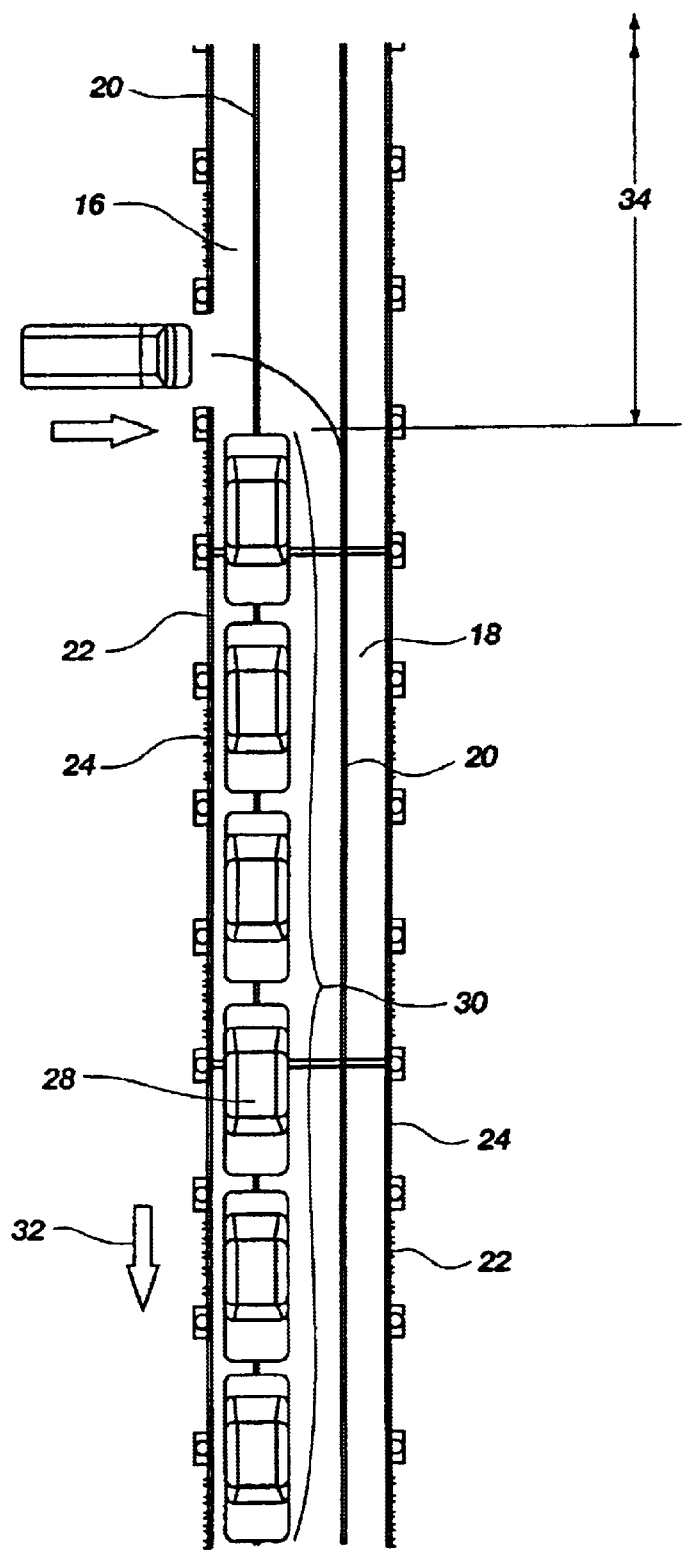
FIG. 4 depicts the method of ingress where the transit lane is on the same side of the guideway as the entrance portal.

Two different methods of entering the guideway and taking a position in the transition lane are shown in FIGS. 3 and 4. Viewing FIG. 3, where the transition lane is adjacent to the portal, the vehicle first crosses the transition lane, and while turning, passes into the transit lane within a relief gap 34 between trains, and immediately crosses back into the transition lane. Naturally, this will be a low speed maneuver (e.g. about 15 mph max). By using both the transit lane and transition lane to effect its entry into the guideway, a larger turning radius enables transverse entry, even entry from a substantially perpendicular position, and eliminates the need for dedicated ramps. Once in the transition lane and facing in the transit direction, the vehicle is prompted by the guidance and control system to accelerate under its own power to the transit speed and merge with a "train" 30 of similar vehicles traveling in the transit lane. It will be apparent that multiple vehicles could enter the guideway at the same time through the same relief gap. Indeed, vehicles having common destinations could be sorted and queued up at ports, then inserted into the system in groups.

It is preferred that the transit speed be a relatively high speed. For example, the system could be designed for speeds such as between 170 and 190 miles per hour. In one embodiment, the preferred speed is about 171 mph (275 kmh). However, other operating speeds may be used. For example, the system could be designed to operate at some desired maximum operating speed, but the actual operating speed could vary, globally or locally, depending on conditions such as congestion, time of day, the characteristics of the vehicles, etc. For example, the operating speed may be adjusted to increase the time characteristics of relief gaps for moving vehicles into and out of the system. If a large gap is needed, the speed of one or more adjacent trains could be temporarily adjusted so as to combine the trains, and thus combine their adjacent relief gaps.

Alternatively, an entire system could be designed for a relatively low speed, such as in a congested urban area. Additionally, a low speed system could be connected to a high speed system through one or more portals, or through specialized ramps. For example, the parking garage of a large office building may include a low-speed guided transit system as described herein, which is connected to an adjacent high-speed guideway. When vehicles exit the high-speed guideway and enter the low-speed garage system, they can be automatically guided to specific areas of the garage, to assigned parking spaces, or to the closest available parking space, such as through a branching system.

Viewing FIG. 4, a similar ingress method is used where the transit lane is adjacent to the portal. In this situation, the vehicle crosses the transit lane within a relief gap, and turns directly into the transition lane in the transit direction. Once the vehicle is centered in the transition lane, it accelerates to the transit speed, and merges with a train in the transit lane as described above. Because the entire system is computer controlled, timing can be very accurate and still avoid collisions of any kind.

While the transit system is shown having transit and transition lanes for use in the same direction, the system could alternatively be configured for bi-directional traffic within the two lane guideway. Such a system may be best suited to low speed and low capacity applications. It will be apparent that in such a system, each direction of traffic could use the opposing lane as its transition lane, and that relief gaps in both directions would have to be properly coordinated to allow such use.

The "trains" 30 comprise multiple vehicles 28 which are very close together and traveling as a unit, though they are not physically connected. However, they are controllably linked (using e.g. a control system comparable to known intelligent vehicle highway systems), such that the driver in each vehicle does not control the movement of his own vehicle once it enters the guideway, and his attention is not required.

One advantageous aspect of this system is flexible multipoint-to-multipoint travel logic. Portals 22 exist on both sides of every module 12, but can only be activated (i.e. opened) at established ports 26. However, new ports can be established at any desired location because all guideway segments include portals on both sides. Portals and/or ports can also have restricted access, thus allowing businesses, governmental facilities, communities, and other locations to control who enters their ports and when. For example, the computer control system may be configured to prevent unauthorized vehicles from selecting a particular destination (portal address) before their commute commences. Once a destination is selected, the computer system determines the optimal route for the vehicle to take to reach the destination, and determines the proper timing to open the portal and guide the vehicle into the guideway to accelerate and unite with a passing "train" of vehicles.

When an individual vehicle 28 approaches its programmed destination portal 22, it automatically separates from the train 30 and crosses into the transition lane 18, where it slows down. Because the vehicles in a train are not physically connected, the departing vehicle does not impede the progress of the train as a whole. Instead, the control system simply causes the remaining vehicles in the train to simply close any gaps in order to maintain the aerodynamic efficiency of the "train," and to thereby add to the size of the relief gaps 34 before or behind the train. Once the exiting vehicle slows to an appropriate exit speed, and is aligned with a relief gap between trains, the vehicle automatically turns and maneuvers itself out of the guideway through the selected portal.

Figure 5:
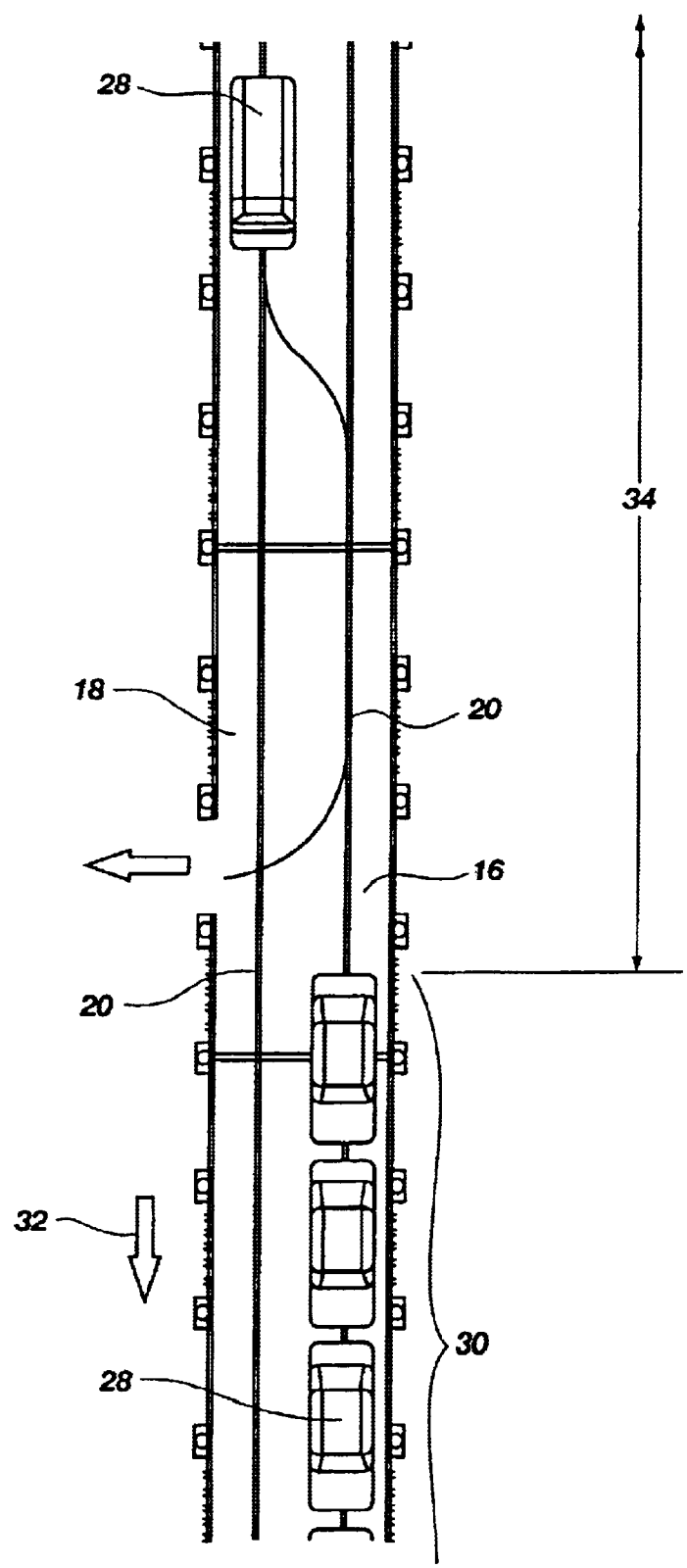
FIG. 5 depicts the method of egress where the transit lane is on the opposite side of the guideway from the exit portal.
Figure 6:
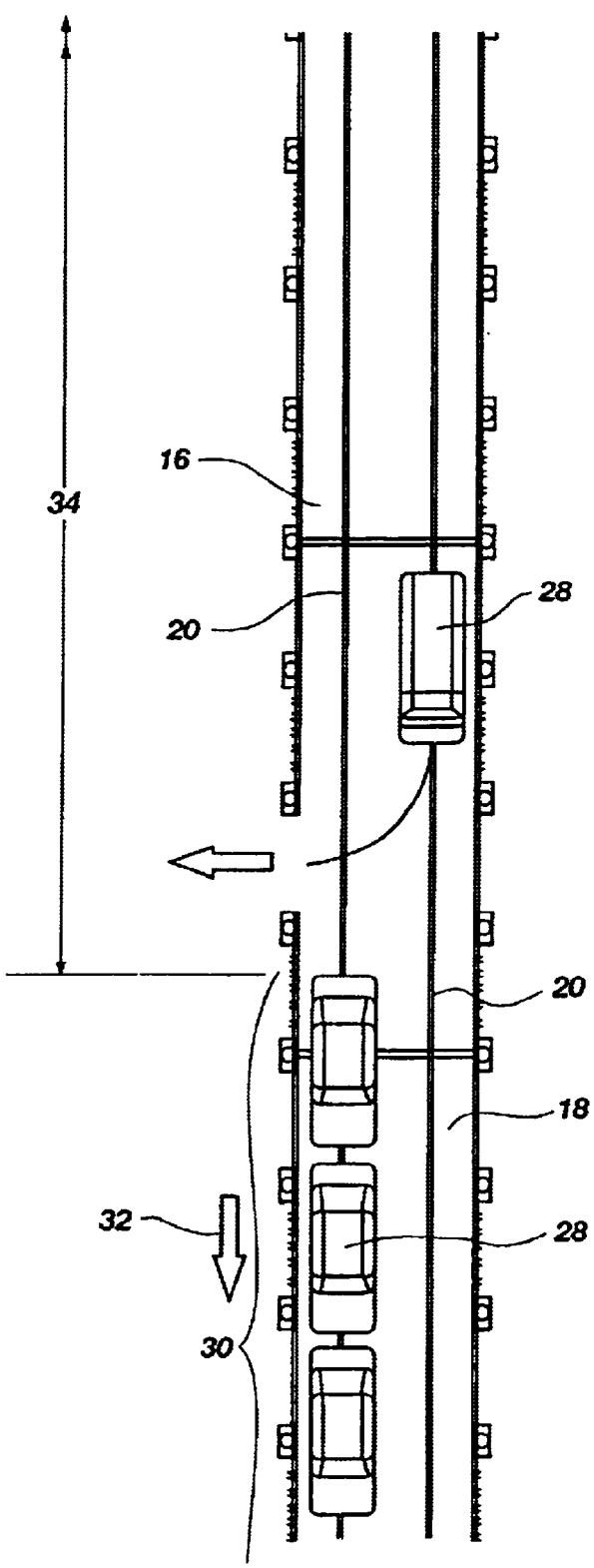
FIG. 6 depicts the method of egress where the transit lane is on the same side of the guideway as the exit portal.

Two different methods of slowing down and leaving the guideway 12 from the transition lane 18 are shown in FIGS. 5 and 6. Viewing FIG. 5, when the intended portal 22 is adjacent to the transition lane, the vehicle 28 will diverge from the train 30 into the transition lane, and slow down so as to align with a relief gap 34. The vehicle then moves back into the transit lane and turns across the transition lane to exit through the destination portal. When the intended portal is adjacent to the transit lane, as depicted in FIG. 6, the vehicle simply diverges from the train and merges into the transition lane, where it slows to its exit speed. When aligned with a relief gap, the vehicle turns and crosses directly over the transit lane and through the exit portal.

As with entering the guideway, it will be apparent that multiple vehicles could exit the guideway in a group. Additionally, for some applications, the guidance system could be configured to allow vehicles to exit the system in reverse. For example, as mentioned above, a port could take the form of a private garage. In such a case, when the vehicle assigned to that port approaches, it enters the transition lane, and may slow to a stop just beyond the portal. When aligned with the appropriate relief gap, the vehicle moves in reverse and exits the guideway directly into the private garage directly behind the portal door. Then, when the driver again intends to use the vehicle, it is exactly positioned to reenter the guideway through the portal.

After leaving the guideway 12 and entering a port 26, control of the vehicle 28 may be returned to the driver for operation in the manner of a conventional motor vehicle. Alternatively, the vehicle may not be a personal vehicle, and may stay at the port, the user(s) simply paying for its use on one or more trips, and disembarking at the final destination port. This sort of use is the presumed mode for individual maglev vehicles (106 in FIG. 10) because the specialized vehicles can only operate on the guideway, and are not configured for driving on conventional roadways. With common-use vehicles, a commuter traveling to a particular office each day may live close to the guideway at some location and walk to a port, or take a bus or other transit system to the port. There the driver boards one of many temporary use or rental vehicles waiting at ports for just this purpose, and travels to a destination port located at his office building or nearby. The user may pay to have a private vehicle, or (for perhaps a lower price) may board a vehicle with other system users headed to the same destination. The rental vehicle can then wait at the destination port for future users, or, because drivers are not required on the guideway system, the vehicle may be automatically sent to another port where demand for its use exists. At the end of the day, the worker simply repeats the process in reverse.

The transit system of the present invention is very economically dynamic, and allows costs to be allocated directly with supply and demand. The system is intended to be mechanically analogous to the Internet, where a set of data is divided and packaged into discrete bundles, and each bundle is sent via the most efficient available route to its destination, where the various bundles are then reassembled into the whole data set. Similarly, the present system assigns the space within the guideway into virtual "packets." Travel on the guideway requires the user to purchase sufficient packets to accommodate the physical size of their vehicle. The cost of the travel is individually apportioned to each vehicle depending upon various economic factors, such as the distance traveled, the location of the origin portal, the location of the destination portal, the time of day, the degree of actual congestion within the guideway at the time, the physical size of the vehicle, the priority of the vehicle, content of the vehicle, grid power used, port entry charges, etc. Other factors may also come into play.

The system can also dynamically adjust to supply and demand in many ways. When congested, it can provide priority access to users willing to pay a higher price. It can allow a user to set (i.e. input into the computer system) a maximum price he/she will pay to obtain a public use vehicle within a certain time frame, such that the highest bidder can always obtain immediate service. During busy times, the price will automatically go up because demand is higher. During slow times, the price will go down because demand is lower. And, because the vehicles can travel autonomously to any port, the supply of public use vehicles can always be directed to the locations where the demand exists. Additionally, if a private vehicle stalls or in some other way causes delay or congestion to other users, the party paying for the trip may be charged (in whole or in part) for the extra delay or other expense created by the breakdown. Thus, ordinary forces of market economics can be harnessed to help ensure an efficient and safe system.

Depending on the commute to the destination portal and the independent destinations of other nearby vehicles, the vehicle may transition to other trains along the way. For additional transition time, a commute may utilize a port as a temporary stop. As an example, at a transit speed of 171 mph, a vehicle may commute from Los Angeles to Dallas (1,430 miles) in about 8.4 hours. The "driver" may recline into a personal bed and awake upon arrival, for the beginning of a business day. The "driver" may also choose to perform additional work during the commute since driving is unnecessary.

The use of repeatable guideway segments facilitates assembly line manufacturing that will bring costs down when compared to traditional highway construction methods. A spline defines the central axis of each guideway segment. Computer Aided Design methods auto-align and "mold" the repeating guideway segments onto each spline. This method creates new guideway segment models with proper curve and slope for each turn. This allows most design optimization, manufacturing, and assembly to be performed automatically. Likewise, it also permits reusing the same part in multiple locations and standardizing curves to maximize commonality and interchangeability. This automated engineering practice reduces engineering design to insignificant proportions, and also reduces manufacturing and assembly costs.

Figure 8:
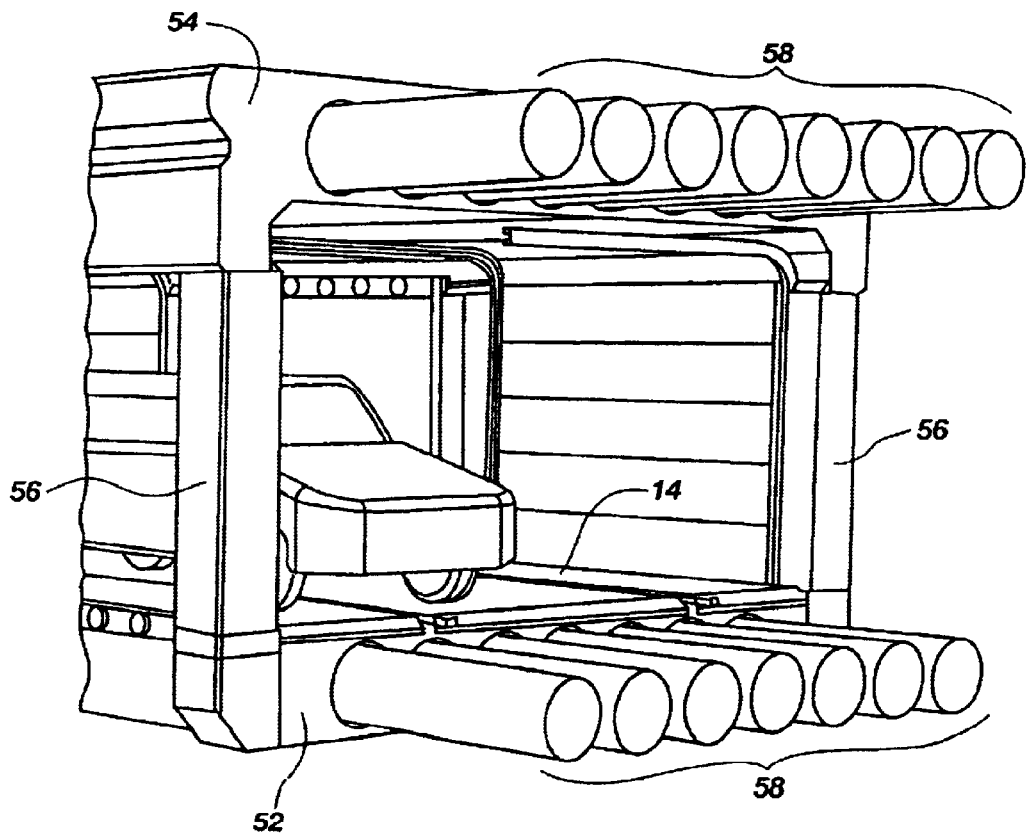
FIG. 8 is a cross-sectional perspective view of a single guideway segment.

The structural design of the guideway segments may take a variety of forms. Referring to FIG. 8, in the configuration shown and described herein, the riding surface 14 comprises a bottom slab 52, and the roof of the guideway is a top slab 54, supported on a plurality of columns 56. As shown, the top and bottom slabs are precast (probably prestressed) concrete slabs (e.g. "voided slabs" as are widely used in small span bridge building). The voids in the slabs, usually in the form of embedded conduits 58, reduce the weight of the respective slab, and also provide a convenient passageway for extending communication lines, power lines, etc. through the length of the guideway. The slabs may also be made using lightweight concrete to further reduce weight.

It will be apparent that the guideway segments can be made of materials other than concrete, and a variety of materials and configurations may be contrived to construct the individual guideway segments in accordance with the present invention. For example, guideway segments having more than two lanes (a transit lane and a transition lane) may be created. Guideway segments with three lanes can allow converging and diverging for providing continuous-flow ramps for non-stop transition from one guideway to another. "Double-decker" guideway segments could be produced. Portal doors that move downward to open (rather than upward) could be used. These are just a few of many possible variations.

For assembly, individual guideway segments 12 may be transported along the top of the previously installed guideway segments from the manufacturing location to the growing guideway. There the new segments may be lowered into place using a traveling gantry crane. Naturally, this will require that the guideway segments be structurally designed to support such traveling loads during construction. Other assembly methods may also be conceived for facilitating rapid construction while reducing costs.

Because portals can only open if they are activated, and can be restricted access, the system provides a dynamic security boundary between departures and destinations. This resolves the inherent conflict between transit systems and communities by allowing transit to pass-by without actually passing through the community. The boundary can be uniquely dynamic, i.e. according to time of day, day of week and by each person's, or cargo's, identity. This system advantageously builds a more dynamic boundary between communities and transit.

Following are several examples of scenarios showing the advantages of this system.

Example 1: A manager asks a subordinate to come to California as soon as possible. There is no need to go to a hub like an airport. The subordinate simply summons a rental vehicle and goes directly to the manager's site in about 2 hours. There is no need to deal with freeway or airport hassles. The subordinate could literally take care of business and return back home in time for dinner.

Example 2: Since the vehicle is autonomous, one family could use a single vehicle for all commutes. The vehicle could return to pick up family members at home, or at other destinations. The vehicle could even provide commutes for the canine companion. Dogs could utilize this system, in their own autonomous way. The family could also drive the vehicle on traditional infrastructure (i.e. between their home and a public port). In addition, the system would be useful to the blind, elderly, under-aged drivers and those who have lost their drivers license due to driving under the influence.

Example 3: Freight vehicles may transport palates of product rather than a truckload. Freight could be shipped more often, with less latency, and be more able to ship around-the-clock, which greatly reduces the need for large hubs and storage. Since the vehicles are autonomous, freight could be shipped during off-peak hours, thus saving costs and optimizing use.

Example 4: A department of transportation may choose to install a system in accordance with this invention instead of having a multi-lane freeway. One transit lane of this system can have more capacity than a four or five lane freeway. In addition, the system minimizes noise pollution, most of the air pollution, require less land, requires less energy, requires less supporting infrastructure, and adds greater value to the surrounding land than a traditional transit system.

Example 5: A community may grant public access to their Ports during the daytime, but close access at night.

The invention thus provides a transit guideway configured to receive multiple independent vehicles and combine them into controllably linked "trains" on a common guideway, the vehicles entering and leaving the guideway in a direction transverse, even substantially perpendicular, to the direction of travel therein. The guideway is preferably comprised of prefabricated enclosed modules, and the transit system follows point-to-point travel logic, which controls the path of each individual vehicle to reach independently selected destinations.

With this system, access is maximized, and the need for expensive and massive supporting infrastructure is minimized. At the same time, existing investment is leveraged by using a common vehicle. In addition, the configuration of the portals permits an economical enclosure. High speed will be more reliable, because weather will no longer be a factor, except in extreme conditions. Large supporting infrastructure often creates bottlenecks. When capacity fills with congestion, the system is affected as a whole. The multipoint-to-multipoint commuting, unlike hub commuting, has a greater ability to reroute, limit and optimize traffic on more parts of the system. Bottlenecks are therefore minimized, because dependencies are reduced.

The system of this invention will have a positive effect on fuel economy, produce a smaller environmental footprint on land, reduce noise and air pollution, and insulate traffic from communities, children, and animals. It provides fully automated transit that is personal, nonstop, high-speed, and replaces traditional hub systems with true multipoint-to-multipoint mass transit. It provides a mechanism for rapid deployment and response of security, military personal, logistical support and emergency vehicles when needed, even to the exclusion of other vehicles, and may even provide some added protection from airborne diseases (naturally occurring diseases and bio-terroristic diseases) because the guideway is enclosed and passengers remain in individual vehicles. As mentioned above, the system provides improved community security and privatization of communities, vehicles and roads, and provides improved mobility for the elderly, handicapped, and other persons not able to hold a drivers license.

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred embodiment(s) of the invention, it will be apparent to those of ordinary skill in the art that numerous modifications can be made without departing from the principles and concepts of the invention as set forth in the claims.

What is claimed is:

1. A transit system, comprising:
   a) a plurality of autonomous vehicles;
   b) a plurality of guideway modules, each having a longitudinal axis, disposed end-to-end to form a continuous guideway for the autonomous vehicles, each module including:
      i. a riding surface with a transit lane and a transition lane;
      ii. portals, disposed in a side of the modules, configured to allow the autonomous vehicles to enter or leave the guideway in a direction substantially transverse to the longitudinal axis;
   c) a plurality of ports, each disposed adjacent to a selected portal, configured to allow the autonomous vehicles to enter or leave the guideway through the selected portal; and
   d) wherein the plurality of autonomous vehicles are configured to allow:
      iii. independent guidance and control of the autonomous vehicle by a driver when outside the guideway;
      iv. automatic guidance and control of the autonomous vehicle during ingress and egress through the selected portal; and
      v. automatic guidance and control of the autonomous vehicle as part of a controllably interconnected "train" of vehicles within the guideway.

2. A transit system in accordance with claim 1, wherein the transition lane is configured to allow the autonomous vehicles to accelerate to or decelerate from a transit speed, and the transit lane is configured to accommodate the autonomous vehicles traveling at the transit speed.

3. A transit system in accordance with claim 1, wherein the autonomous vehicles draw motive power from the guideway.

4. A transit system in accordance with claim 1, wherein the autonomous vehicles comprise a linear motor.

5. A transit system in accordance with claim 4, wherein the autonomous vehicles are magnetically levitated above the riding surface.

6. A transit system, comprising:
   a) a plurality of vehicles;
   b) a substantially enclosed guideway for the vehicles, having a transit lane and a transition lane;
   c) selectively actuable portals, disposed along the guideway, configured to allow substantially transverse ingress and egress of the vehicles to and from the guideway;
   d) the plurality of vehicles being configured for automatic control within the guideway and during ingress and egress through a selectively actuable portal; and
   e) a guidance system, configured to guide the vehicles within the guideway and during ingress and egress, and to allow each vehicle to use independently selected origin and destination portals.

7. A transit system in accordance with claim 6, further comprising a plurality of ports, each disposed adjacent to one or more of the selectively actuable portals, and configured to guide the vehicles while entering or leaving the guideway through the selectively actuable portals.

8. A transit system in accordance with claim 7, wherein at least some of the vehicles are configured for independent operation and control by a driver outside of the guideway, and the plurality of ports are configured to effect a transition of control of the vehicles between the guidance system and the respective drivers.

9. A transit system in accordance with claim 6, wherein the guideway comprises a plurality of pre-fabricated modules disposed end-to-end.

10. A transit system in accordance with claim 6, wherein the guideway includes windows and drain openings.

11. A transit system in accordance with claim 6, further comprising a pedestrian walkway disposed atop the substantially enclosed guideway.

12. A transit system in accordance with claim 6, further comprising a track for a mass-transit train disposed atop the substantially enclosed guideway.

13. A transit system in accordance with claim 12, wherein the track for the mass-transit train is configured to accommodate a magnetically levitated train.

14. A transit system in accordance with claim 6, wherein the guidance system is configured to (i) combine at least some of the plurality of vehicles into controllably linked "trains" of proximate vehicles for travel in the transit lane, and (ii) guide individual vehicles to join and detach from the controllably linked "trains" as needed to accommodate vehicles using independently selected origin and destination portals.

15. A transit system in accordance with claim 6, wherein the transition lane is configured to allow the vehicles to accelerate to or decelerate from a transit speed in a transit direction, and the transit lane is configured to accommodate the vehicles traveling at the transit speed in the transit direction.

16. A transit system in accordance with claim 6, wherein the transit direction is reversible.

17. A transit system in accordance with claim 6, wherein the vehicles draw motive power from the guideway.

18. A transit system in accordance with claim 6, wherein the vehicles are magnetically levitated.

19. A transit system in accordance with claim 6, wherein a cost of travel on the guideway is individually apportioned to each independent vehicle depending upon one or more transportation economic factors selected from the group consisting of the distance traveled, the location of the origin portal, the location of the destination portal, the time of day, the degree of actual congestion within the guideway, the physical size of the vehicle, the priority of the vehicle, content of the vehicle, grid power used, and port entry charges.

20. A transit system in accordance with claim 6, wherein access to selected ones of the selectively actuable portals is restricted.

21. A transit system in accordance with claim 6, wherein the guidance system is configured to automatically modify the motion of vehicles within the guideway to accommodate congestion and emergency conditions.

22. A method for transporting independent vehicles along a common guideway from independently selected origin portals to independently selected destination portals, comprising the steps of:
   a) guiding one of the independent vehicles at an ingress speed through a selected origin portal in a side of an elongate transit guideway and into a transition lane within the guideway, such that the independent vehicle initially enters the guideway in a direction substantially transverse to a length of the guideway, then turns to face in a transit direction in the transition lane;
   b) accelerating the independent vehicle from the ingress speed to a transit speed in the transit direction while in the transition lane;
   c) merging the independent vehicle into a transit lane that is parallel and adjacent to the transition lane;
   d) merging the independent vehicle from the transit lane into the transition lane while traveling at substantially the transit speed before reaching a selected destination portal;
   e) slowing the independent vehicle from the transit speed to an egress speed while in the transition lane; and
   f) guiding-the independent vehicle to turn from the transit direction to a direction substantially perpendiculer thereto so as to leave the guideway at the egress speed through the destination portal.

23. A method in accordance with claim 22, further comprising the steps of:
   g) dividing physical space within the guideway into virtual "packets," and
   h) apportioning a cost of travel on the guideway to the independent vehicle according to a physical size of the independent vehicle relative to a size of the packets.

24. A method in accordance with claims 22, further comprising the steps of:
   a) controllably linking the independent vehicle to a "train" of other vehicles that are controllably linked and traveling in the transit direction at the transit speed in the transit lane; and
   b) controllably detaching the independent vehicle from said "train" before reaching the destination portal.

25. A method in accordance with claim 22, further comprising the step of apportioning a cost of travel on the guideway to each independent vehicle depending upon one or more transportation economic factors selected from the group consisting of the distance traveled, the location of the origin portal, the location of the destination portal, the time of day, the degree of actual congestion within the guideway, the physical size of the vehicle, the priority of the vehicle, content of the vehicle, grid power used, and port entry charges.

26. A guideway module for a transit system, comprising:
   a) an elongate, substantially enclosed tubular segment, having a longitudinal axis, sides, a top, and open ends, configured to be connected end-to-end with other similar segments;
   b) a riding surface within the segment, including a transit lane and a transition lane; and
   c) portals, disposed in the sides of the segment, configured to allow vehicles to enter or leave the guideway module in a direction substantially transverse to the longitudinal axis thereof.

* * * * *